July 7, 1953     H. S. VAN BUREN, JR     2,644,214
THREE-SIDE LOCK SNAP FASTENER
Filed Oct. 21, 1950
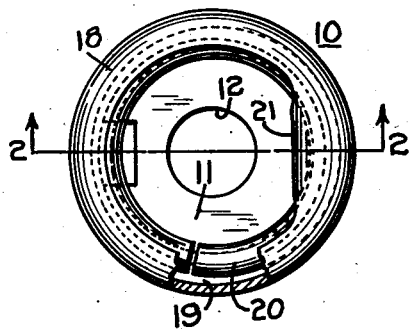
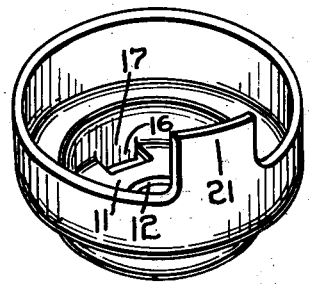
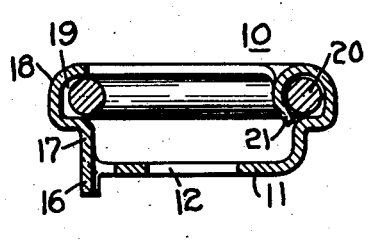
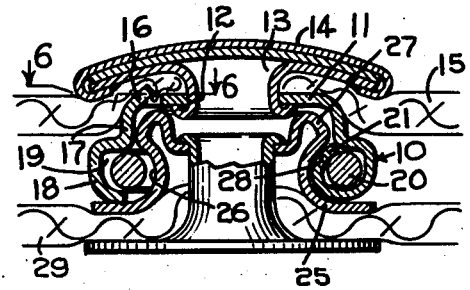
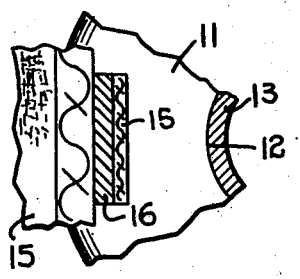
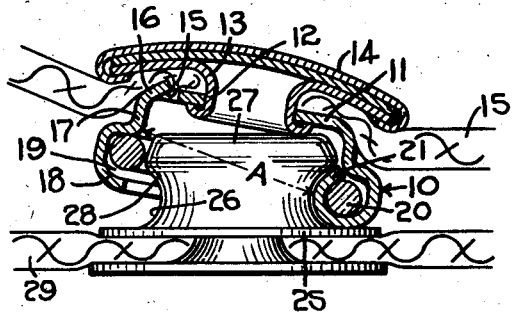
INVENTOR:
HAROLD S. VAN BUREN JR,
By Robert E Ross
AGENT.

Patented July 7, 1953

2,644,214

UNITED STATES PATENT OFFICE 2,644,214

THREE-SIDE LOCK SNAP FASTENER

Harold S. van Buren, Jr., Cambridge, Mass., assignor to United-Carr Fastener Corporation, Cambridge, Mass., a corporation of Massachusetts Application October 21, 1950, Serial No. 191,406

8 Claims. (Cl. 24—218)

This invention relates to snap fasteners, and aims generally to improve the construction and operation of snap fasteners of the type in which the socket and cooperating stud member can be disengaged only by a separating force applied on one predetermined side of the assembly.

A primary object of the invention is the provision of an improved three-side lock snap fastener assembly which is simpler, stronger and more economical in construction than prior devices of this type and in which a minimum of parts is required to be aligned during assembly thereof.

A further object of the invention is the provision of a snap fastener assembly having improved means for preventing separation of the socket and cooperating stud member in response to separating forces applied on any one of three sides of the assembly and for permitting ready separation thereof in response to a force applied on the fourth side of the assembly.

Another object of the invention is to provide a three-side lock snap fastener socket in which means which is provided thereon for alignment of the socket in an automatic attaching machine is also adapted to engage a portion of the supporting sheet to which the socket is attached to prevent rotation of the socket relative thereto.

These and other objects and advantages of the invention will be apparent to persons skilled in the art from a consideration of the accompanying drawing and annexed specification illustrating and describing a preferred construction embodying the invention.

In the drawings:

Fig. 1 is a plan view of the socket member embodying the features of the invention;

Fig. 2 is a view in section taken on the line 2—2 of Fig. 1;

Fig. 3 is a perspective view of the body of the socket member during one stage of the manufacture thereof;

Fig. 4 is a view in elevation, partly in section, of the socket member of the invention attached to a supporting sheet and assembled with a stud member; and Fig. 5 is a view in elevation partly in section of the socket and cooperating stud member showing the effect of a disengaging force applied on the unlocking side of the socket; and Fig. 6 is a view in section taken on line 6—6 of Fig. 4.

Referring to the drawings, there is illustrated a three-side lock snap fastener assembly comprising a socket member 10 and a cooperating stud member 25. The socket member 10 is preferably formed of sheet metal and comprises a base member 11 having an opening 12 therein for receiving a rivet 13 for attaching the socket to an attaching cap 14, and a supporting sheet 15. A tab 16 is punched out from the base member 11 and cooperates with an automatic attaching machine to align the socket in a predetermined direction prior to attachment thereof to the supporting sheet 15. During such attachment the tab 16 is bent over to the position shown in Fig. 4 and in so doing grips a portion of the material of the supporting sheet 15, thereby assisting in preventing rotation of the socket.

Extending upwardly from the base member 11 is a circular wall 17 having a radially enlarged portion 18 thereon forming a circumferential recess 19 in the interior of the wall. The recess 19 is concentrically arranged with respect to the wall 17 and is shaped to receive a split ring spring member 20. The spring member 20 is disposed in the recess 19 to engage and retain the stud member 25 when it is inserted into the socket and is smaller in diameter than the recess, thereby allowing the spring member room for lateral movement and expansion therein in response to a separating force applied to the socket and stud members as will be more apparent hereinafter.

Integrally attached to the enlarged portion 18 and extending inwardly from the edge thereof is a tab or tongue 21. The tab 21 is curled inwardly over and around the spring member 20 and, as shown in Figs. 4 and 5, projects radially inwardly beyond the inner surface of the circular wall 17 for a purpose which will be hereinafter described.

The stud member 25 comprises a shank having a concave neck portion 26 which is smoothly rounded inwardly in longitudinal cross section, that is, as seen in Fig. 4, and has an enlarged head portion 27 disposed thereon forming a shoulder 28. The stud member 25 is adapted to be attached to a supporting sheet 29 in the conventional manner.

The socket member 10 may desirably be formed by drawing a flat sheet of suitable shape to provide the circular wall portion 17, the enlarged portion 18 and the projecting tab 21 as shown in Fig. 3. The spring 20 is then positioned therein, and the enlarged portion 18 is subsequently curled inwardly over the spring by suitable dies to form the recess 19 as shown in the drawings of the completed socket. The tab 21 may simultaneously be curled inwardly over and around the spring member 20 as shown in Figs. 4 and 5. In the preferred embodiment the shape of the tab or tongue 21 provides a smoothly rounded inwardly projecting inner surface to conform generally to the shape of the concave neck portion 26 of the stud.

In accordance with the invention the circular wall 17 designed to fit over and around the enlarged head portion 27 of the stud member 25 when the stud is engaged in the socket and is of a diameter such that the distance between the innermost surface of the tab 21 and the portion of the wall 17 opposite thereto is less than the diameter of the enlarged head portion 27 of the stud member 25. By virtue of this construction a disengaging or separating force applied to the stud and socket at any point other than directly opposite the tab 21 causes the tab to engage the shoulder 28 of the stud member and the portion of the wall 17 opposite thereto to engage the enlarged head of the stud (see Fig. 4). Since the distance between the tab and the opposite portion of the wall 17 is less than the diameter of the enlarged head portion of the stud member, the tab 21 cannot ride upwardly over the shoulder 28 and hence the stud and socket members are locked in assembled relation.

However, when a separating force is applied to the stud and socket members on the side opposite the tab 21 the socket is tilted upwardly on this side, pivoting the contracted neck portion 26 of the stud on the inwardly curled portion of the tab 21 (see Fig. 5). During this tilting movement the spring member 20 expands into the adjacent part of the recess 19 and rides upwardly over the enlarged head portion 27 of the stud member, thus permitting disengagement of the stud and socket.

For proper operation of the device, the depth of the recess 19 must be in proper relation to the cross-sectional diameter of the spring 20 and the clearance between the enlarged head portion 27 of the stud and the socket wall 17. The portion of the spring 20 opposite the tab 21 must be able to pass almost completely into the recess, and when so positioned the distance between the innermost surface thereof and the tab 21 must be slightly greater than the distance between the oppositely disposed contracted and enlarged portions of the stud as measured, for example, along the line A in Fig. 5.

In assembling the socket 10 with the stud 25 the inwardly curled locking tab 21 of the socket is first positioned in the contracted neck portion 26 of the stud. The stud and socket are then snapped into locked engagement by pressing them together.

The device of the invention provides a strong and durable construction for retaining the stud and socket members in locked relation against separating forces applied on three sides while permitting ready separation in response to a separating force applied on the fourth side. The tab 21 is reinforced by the spring member 20 about which it is curled and may, if desired, be further strengthened and stiffened by extending the end thereof into engagement with the wall of the socket.

Although I have illustrated and described one preferred form of my invention, I do not wish to be limited thereby as the scope of the invention is best defined by the appended claims.

I claim:

1. A snap fastener socket member for use with a stud having an enlarged head portion and a contracted neck portion, said socket member comprising a hollow body having an opening therein to receive the stud, said body having an annular recess adjacent said opening, an annular expansible spring member disposed in said recess, and means on one side of said body extending radially into the opening protecting a portion of said spring on one side of the body from receiving axial forces during insertion and withdrawal of the stud.

2. A snap fastener socket member for use with a stud having an enlarged head portion and a contracted neck portion, said socket member comprising a hollow body having an opening therein to receive the stud, said body having an annular recess adjacent said opening, an annular expansible spring member disposed in said recess, and means on said body extending around said spring on one side of the body and projecting radially into the opening to prevent contact of the stud and the spring on said one side.

3. A snap fastener socket member for use with a stud having an enlarged head portion and a contracted neck portion, said socket member comprising a hollow body having an opening therein to receive the stud, said body having an annular recess adjacent said opening, an annular expansible spring member disposed in said recess, means on said body confining said spring in the recess on one side of the body, said means being disposed about the spring and projecting radially into the opening so that during insertion and withdrawal of a stud, contact of the stud with the spring is prevented.

4. A snap fastener socket member for use with a stud having an enlarged head portion and a contracted neck portion, said socket member comprising a hollow body having an opening therein to receive the stud, said body having an annular recess adjacent said opening, an annular expansible spring member disposed in said recess, and locking means on one side of said body extending radially into said opening for engagement with the enlarged head of the stud to prevent disengagement of the stud from the socket by a separating force applied on said one side, said locking means extending around the spring so as to prevent contact between the stud and the spring when said disengaging force is applied.

5. A snap fastener socket member for receiving in snapping engagement a stud having an enlarged head portion and a contracted neck portion, said socket member comprising a hollow body having a stud receiving cavity, an internal annular recess in said body, an expansible ring spring member disposed in the recess, and a tongue disposed on the body, said tongue being curled around the spring on one side of the body, the portion of the tongue disposed about the spring projecting radially into the stud receiving cavity a distance sufficient to project into the contracted neck portion of an assembled stud.

6. A snap fastener socket member for receiving in snapping engagement a stud having an enlarged head portion and a contracted neck portion, said socket member comprising a hollow walled body having a stud receiving cavity, an internal annular recess formed in the wall of the body, an expansible ring spring member disposed in the recess and restricting the entrance to the cavity, and a tongue extending from the upper edge of the wall of the recess, said tongue extending inwardly, downwardly and outwardly around the spring on one side of the socket, the medial portion of the tongue projecting into the stud receiving cavity to further restrict the entrance thereto on said one side of the socket.

7. A snap fastener socket member for receiving in snapping engagement a stud having an enlarged head portion and a concave contracted neck portion, said socket comprising a base for attachment to a supporting sheet, a peripheral upstanding wall on the base forming a stud receiving cavity, said wall having an internal annular recess spaced from the base, an expansible ring spring member disposed in the recess and restricting the entrance to the cavity, and a tongue joined to the wall above the spring on one side of the socket, said tongue being curled inwardly around the spring and projecting into the stud receiving cavity to further restrict the entrance thereto on said one side of the socket, the portion of the tongue projecting into the cavity presenting a smoothly rounded surface for entering the concave contracted neck portion of an assembled stud.

8. A snap fastener assembly, comprising a stud having an enlarged head portion and a concave neck portion which is smoothly rounded inwardly in longitudinal cross section, and a socket member for receiving the stud in snapping engagement, said socket comprising a hollow body having a base for attachment to a supporting sheet, a peripheral upstanding wall on the base forming a stud receiving cavity, said wall having an internal peripheral recess spaced from the base, an expansible split ring spring disposed in the recess and restricting the entrance of the stud receiving cavity, and a tongue joined to the wall above the spring on one side of the socket, said tongue extending around the spring and having a smoothly rounded inwardly projecting medial portion projecting into the stud receiving cavity in position to enter the concave neck portion of the stud.

HAROLD S. van BUREN, Jr.

References Cited in the file of this patent

UNITED STATES PATENTS

| Number | Name | Date |
|---|---|---|
| 1,234,359 | McCormack | July 24, 1917 |
| 1,278,798 | Carr | Sept. 10, 1918 |
| 2,328,016 | Huelster | Aug. 31, 1943 |
| 2,441,573 | Huelster | May 18, 1948 |
| 2,552,764 | Bedford | May 15, 1951 |